(12) United States Patent
Landherr

(10) Patent No.: US 6,341,770 B1
(45) Date of Patent: Jan. 29, 2002

(54) CUTTING BOARD COMBINATION

(76) Inventor: Joseph P. Landherr, 107 Second St. S.E., Rose Creek, MN (US) 55970

( * ) Notice: Subject to any disclaimer, the term of this patent is extended or adjusted under 35 U.S.C. 154(b) by 0 days.

(21) Appl. No.: 09/841,818

(22) Filed: Apr. 25, 2001

Related U.S. Application Data

(60) Provisional application No. 60/200,924, filed on May 1, 2000.

(51) Int. Cl.$^7$ ................................................. B23Q 3/00
(52) U.S. Cl. ............................. 269/289 R; 269/302.1; 269/309; 269/308
(58) Field of Search ....................... 269/302.1, 289 R, 269/309, 308, 290

(56) References Cited

U.S. PATENT DOCUMENTS

| | | | |
|---|---|---|---|
| 157,283 A | * 12/1874 | Gurney | 269/302.1 |
| 3,625,162 A | 12/1971 | Crew | |
| D230,553 S | * 3/1974 | Terlizzi | 269/302.1 |
| 4,243,184 A | 1/1981 | Wright | |
| 4,273,319 A | 6/1981 | Crowhurst | |
| 4,456,021 A | * 6/1984 | Leavens | 269/302.1 |
| 4,765,603 A | * 8/1988 | Huppert | 269/302.1 |
| 4,907,789 A | 3/1990 | Tice | |
| D317,551 S | 6/1991 | King | |
| 5,363,755 A | 11/1994 | Liang | |
| 5,382,009 A | * 1/1995 | Mertz et al. | 269/302.1 |
| 5,848,772 A | 12/1998 | Fitzgerald | |

* cited by examiner

*Primary Examiner*—Joseph J. Hail, III
*Assistant Examiner*—Lee Wilson
(74) *Attorney, Agent, or Firm*—Robert W. Gutenkauf; Malcolm D. Reid; Peter Forrest

(57) ABSTRACT

A cutting board combination for use with a double basin sink having a sink divider separating the two basins. The cutting board combination includes a first cutting board that has a flat upper cutting surface and a pair of spaced apart legs fixed to the bottom surface. The legs are spaced apart to straddle the sink divider with the cutting board base supported on it with lateral edges overlapping the sink basins on either side. The cutting board combination includes a second cutting board that can be connected at an inner lateral edge to a lateral edge of the first cutting board. The second cutting board is connected to the first in such a fashion that the work surfaces of the two are coplanar. The inner lateral edge of the second cutting board is supported by the first cutting board. The second cutting board has a length sufficient so that it spans the sink basin with the outer lateral edge supported on the sink rim.

15 Claims, 2 Drawing Sheets

CUTTING BOARD COMBINATION

CROSS REFERENCE TO A RELATED APPLICATION

This application claims the benefit of U.S. Provisional patent application Ser. No. 60/200,924 filed May 1, 2000.

BACKGROUND OF THE INVENTION

Food preparation that involves cutting, slicing and chopping is conveniently done over the kitchen sink. Food scraps to be discarded are easily swept into the sink basin with access to the waste disposal unit. Food in stages of preparation is easily washed. For this reason some over-the-sink chopping boards have been suggested. See, for example, U.S. Pat. No. 3,625,162 to Crew, and U.S. Pat. No. 4,765,603 to Huppert as well as U.S. Pat. No. 4,243,184 to Wright. Such devices also add food preparation surface to the existing kitchen counter space which might already be crowded as during preparation of a large meal.

SUMMARY OF THE INVENTION

Broadly stated, the present invention is directed to a cutting board combination for use with a double basin sink of the type having a sink divider between the basins. The combination cutting board includes a first, smaller cutting board adapted to be removably mounted on the divider separating the sink basins. The first cutting board is comprised of a generally rectangular hard slab-like member having a top, flat, relatively indestructible smooth work surface. A pair of spaced apart vertically depending legs are rigidly secured to the bottom surface of the first cutting board. The legs are adapted to straddle the sink divider with the cutting board resting upon it whereby the first cutting board is usable as a stand-alone cutting board with lateral edges that overhand the sink basins.

The cutting board combination includes a second, larger cutting board that can be connected to the first cutting board to increase the work surface area. One lateral edge of the second cutting board abuts a lateral edge of the first cutting board. The second cutting board is long enough to span the width of the sink basin so that the opposite lateral edge overlaps the sink rim. The second cutting board is likewise comprised of a flat, rectangular slap-like member with a flat top surface that is preferably flush with the top surface of the first cutting board when the two are connected. The first cutting board has connecting means on both lateral edges so that the second cutting board can be connected to either side to span either sink basin.

DESCRIPTION OF A PREFERRED EMBODIMENT

Figure 1:
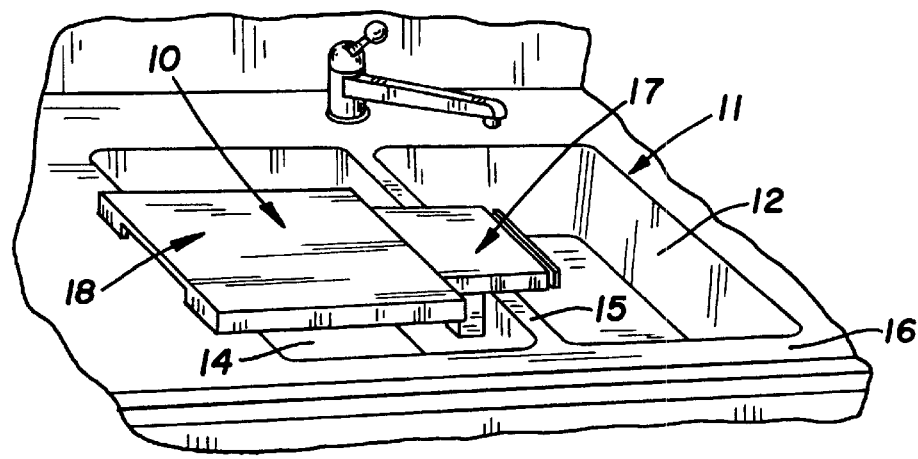
FIG. 1 is a perspective view of a double basin sink with a sink divider separating the basins and a cutting board combination of the invention installed thereon.

Referring to the drawings and in particular to FIG. 1, there is shown a cutting board combination according to the invention indicated generally at 10 installed on a double basin sink 11. Sink 11 has a right basin 12 and a left basin 14 separated by a divider 15 and surrounded by a rim 16.

The cutting board combination includes a first, smaller cutting board 17 and a second, larger cutting board 18. The first cutting board 17 is installed on the sink divider 15 with lateral edges overlapping the right and left sink basins 12 and 14. The second cutting board 18 is interlocked with the first cutting board. An inner lateral edge of the second cutting board 18 is connected to and supported by one end of first cutting board 17. The second cutting board 18 is longer and wider than the first. It has a length sufficient to span the sink basin. The outer lateral edge of second cutting board 18 opposite the first cutting board rests upon and is supported by the sink rim.

Each of the cutting boards is comprised of a generally rectangular, slab-like member with a flat upper cutting or work surface. Preferably each slab is constructed of a hard, relatively indestructible material presenting a suitable work surface for cutting meat, slicing and chopping vegetables, and the like. Exemplary materials include stone, such as marble; treated woods; hard synthetic resinous plastic materials, such as acrylics (Corian); metal such as aluminum; pyrolitic carbon; and the like.

Figure 2:
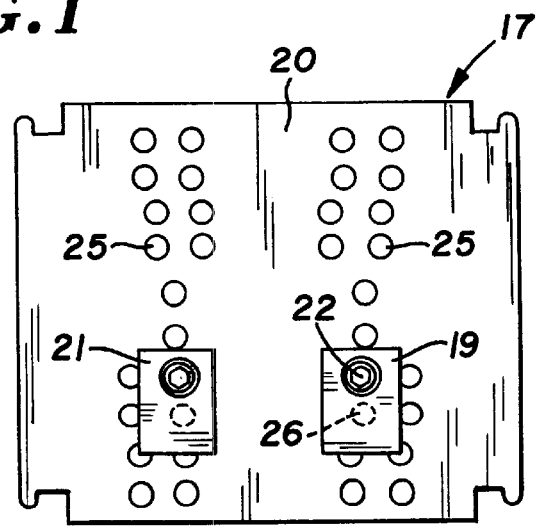
FIG. 2 is a bottom plan view of the first cutting board of the combination cutting board shown in FIG. 1.
Figure 3:
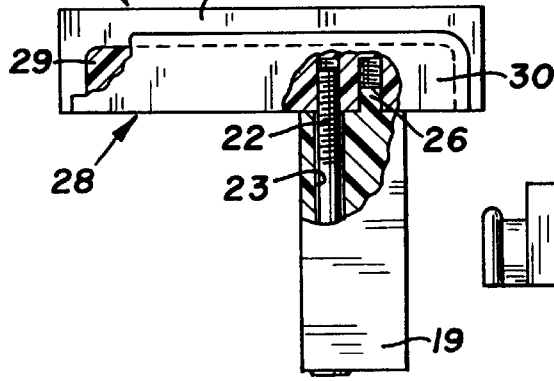
FIG. 3 is a side elevational view of the first cutting board shown in FIG. 2 with portions broken away for purposes of illustration.
Figure 4:
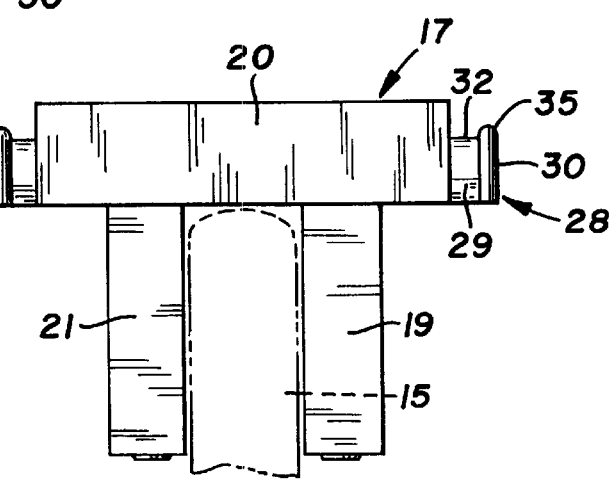
FIG. 4 is a front elevational view of the first cutting board shown in FIG. 2.

As shown in FIGS. 1 through 4, the first cutting board 17 is adapted to be installed on the sink divider 15 and used thereon as a stand alone cutting board. The first cutting board 17 has a pair of legs 19, 21 rigidly fixed to the bottom surface of the base 20 of the cutting board and extending downwardly therefrom. Legs 19, 21 are desirably rectangular in cross-section and are spaced apart a distance to straddle the sink divider 15 and engage opposite sides thereof As shown in FIG. 2, the legs 19, 21 can be mounted off-center of a lateral centerline through the base of the cutting board. This lends versatility to positioning of the cutting board on the sink divider. The legs can be permanently connected to the base of the cutting board, or, as shown in the drawings, the legs can be removably secured and adjustable in order to accommodate different sizes of sink dividers. The bottom surface of base 20 of first cutting board 17 has an array of threaded mounting holes 25 tapped therein for mounting the legs 19,21. As shown in FIG. 3, a leg 19 has a longitudinal countersunk bore 23. A bolt 22 is located in the bore 23 and has an end threaded into one of the holes 25. The end of the leg abutting the bottom surface of base 20 has a peg 26. The peg 26 occupies another one of the holes 25. The pegs on the legs orient the legs so that their inside facing surfaces are maintained parallel for best engagement with the sink divider and to prevent rotation of the legs. Peg 26 is spaced from bore 23 by a distance equal to the spacing between adjacent holes 25 go that the peg is assured of having a hole to fit in when a bolt 22 is threaded into one of the holes. The holes 25 are provided in a symmetrical pattern of spaced apart groups of two to permit symmetrical location of the legs with a spacing best adapted to engage the sides of the sink divider 15. As shown in FIG.

2, the peg and bore of a leg are aligned with one side of the leg and are centrally offset. This allows rotation of the leg 180° to achieve a different spacing between the two legs.

The first cutting board 17 and the second cutting board 18 are releasably connectable so that one (inner) lateral edge of the second cutting board is supported by a lateral edge of the first cutting board, and the opposite (outer) lateral edge of the second cutting board is supported on the sink rim. A first connector is located on the first cutting board and a second connector is located on the second cutting board. The connecting structure on the first cutting board functions to support and interlock the inner edge of the second cutting board. The first cutting board can have a pair of connectors, one on each lateral edge, so that the second cutting board can conveniently be assembled to either lateral edge of the first board and span the respective sink basin. The cutting boards are connectable in such a fashion that the work surfaces are substantially co-planar.

A particular connecting structure is shown in the drawings for purposes of illustration, although the invention is not limited to any particular connecting structure. The supporting and locking structure may take a variety of shapes so long as it provides support to maintain the top working surfaces of both cutting boards substantially in a common plane (some deviation may be necessary to accommodate sinks with a divider lower than the sink rim) and to lock the boards together to prevent inadvertent separation. Depending on the materials from which the sections are formed, the supporting and locking structure may be integral with the cutting board, being molded or machined therein, or it may be formed from separate elements and permanently attached to the cutting board body.

In the form shown, a first connecting member 28 is fastened to a lateral edge of the first cutting board 17. The connecting member 28 has a neck 29 connected at one side to the board 17, and a lip 30 connected to the other side of the neck 29, forming an upwardly open hook-like structure. The top surface of neck 29 is parallel to and recessed beneath the top of cutting board base 20. The top edge of lip 30 extends above the top surface of neck 29 but still beneath the working surface of cutting board 17. That is, lip 30 has a length and width greater than the neck 29 but less than the corresponding dimensions of the lateral end of the first cutting board 17. A top groove 32 is formed between the inner wall of lip 30 exposed above the neck 29, and the vertical side wall of the lateral edge of cutting board 17.

Figure 8:
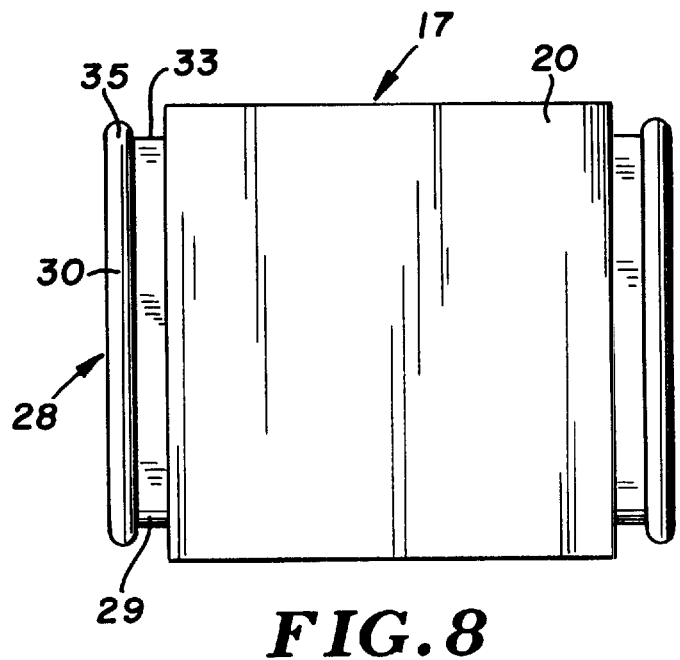
FIG. 8 is a top plan view of the first cutting board.

In the top plan view of FIG. 8, it is seen that neck 29 is shorter than the lateral edge of the cutting board. The lip 30 is also shorter than the lateral edge of the cutting board 17 but longer than the neck 29. A side groove 33 is formed on either side of neck 29 between the end of the head 30 and the end portion of the lateral side of the cutting board 17. A connecting flange is formed by the surfaces of lip 30 extending beyond the neck 29 and facing the lateral edge of the base 20 of cutting board 17.

Figure 5:
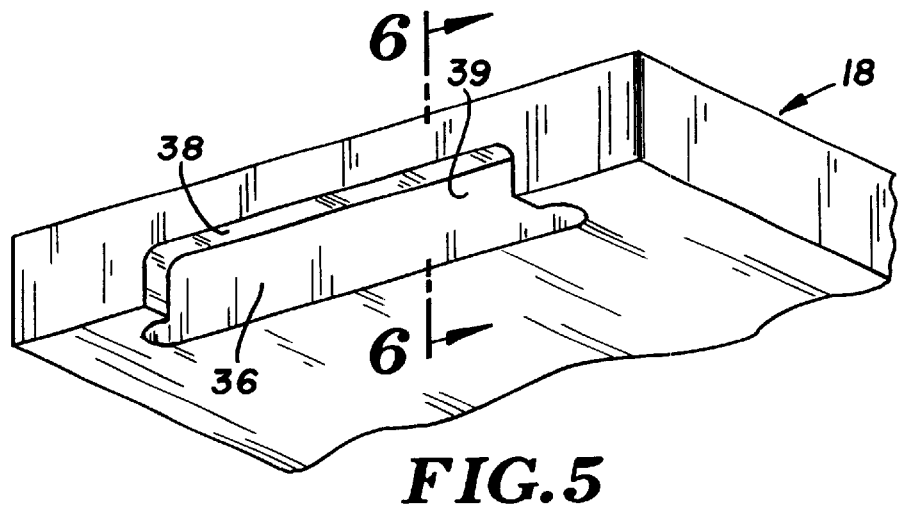
FIG. 5 is a fragmentary bottom view in perspective of a portion of the second cutting board of the cutting board combination of the invention.
Figure 6:
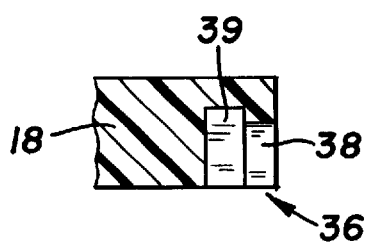
FIG. 6 is a sectional view of a portion of the cutting board of FIG. 5 taken along the line 6—6 thereof.

As shown in FIGS. 5 and 6, the second cutting board 18 is provided with a second connector in the form of a laterally and downwardly open receptacle opening 36 for receipt of connecting member 28 on the first cutting board 17. Receptacle opening 36 is a complementary reverse image of connecting member 28 such that connecting member 28 fits snugly within it. Receptacle opening 36 includes a first slot 38 formed in the lower lateral edge of the second cutting board 18. The first slot 38 corresponds in length to (but is slightly larger than) the length of the neck 29 on the first cutting board, and corresponds in width to (but is slightly larger than) the width of the neck 29 for close accommodation of the neck 29. The second slot 39 is spaced in from the first slot 38 and is longer and wider. The second slot 39 has a length likewise corresponding to the length of the lip 30 on the first cutting board, and a width likewise corresponding to the width of the lip 30 for close accommodation of the lip 30.

Figure 7:
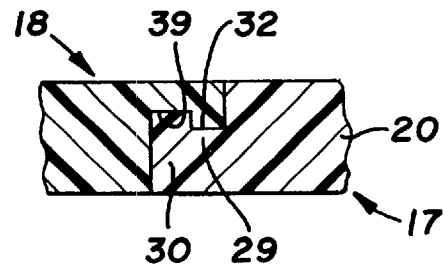
FIG. 7 is a sectional view like that of FIG. 6 but showing the edge of the first cutting board interlocked with the edge of the second cutting board.

The connecting member 28 fits in the receptacle opening 36 in interlocking relationship. The inner slot 39 extends beyond the length and depth of outer slot 38 whereby a cavity is formed to hold the flange 35 when the first connecting member 28 is installed in the receptacle opening 36. FIG. 7 shows the interlocking fit. The inner lateral edge of the second cutting board is supported by the first cutting board through the first connector 28 and is interlocked by it in order to prevent inadvertent disengagement. At the same time, the opposite or outer lateral edge of the second cutting board is supported on the rim of the sink. The first connector 28 and second connector 36 are dimensioned and spaced such that upon interconnection, the work surfaces of the two cutting boards are co-planar.

In use of the invention, the first cutting board is temporarily installed on the divider of a double basin sink. The first cutting board is so usable as a stand alone cutting board. The legs can be permanently fixed to the bottom surface and spaced apart a distance to accommodate a standard width sink divider. Alternatively, the legs can be adjustable in position as shown in the drawings. As needed, the second cutting board is connected to the first and spans the length of a sink basin, with an opposite edge resting on the sink rim.

The foregoing description is illustrative of one embodiment of the invention. Various modifications and embodiments of the invention will be apparent to those skilled in the art without departing from the scope and spirit of the claims.

The embodiments of the invention in which an exclusive property or privilege is claimed are defined as follows:

1. A cutting board combination for temporary installation on a double basin sink of the type having a sink divider between the basins, and a sink rim, comprising:

a first cutting board having lateral edges, an upper work surface, a bottom surface, and first and second legs connected to the bottom surface adapted to straddle a sink divider of a double basin sink with the lateral edges of the first cutting board overhanging the basins of the sink;

a second cutting board having an upper work surface and inner and outer lateral edges;

first connecting means on the first cutting board;

second connecting means on the second cutting board;

said first and second connecting means being interconnectable so that the inner lateral edge of the second cutting board abuts a lateral edge of the first cutting board with the work surfaces of the two cutting boards substantially coplanar, and the inner lateral edge of the second cutting board is supported by the first cutting board;

said second cutting board having a length sufficient that the outer lateral edge thereof rests upon the sink rim when the first and second connecting means are connected and the first cutting board is installed on a sink divider.

2. The cutting board combination of claim 1 wherein:

the first connecting means is on a lateral edge of the first cutting board and the second connecting means is on the inner edge of the second cutting board.

3. The cutting board assembly of claim 2 including:

a first connecting means on each lateral edge of the first cutting board.

4. The cutting board of claim 2 wherein:

said first connecting means includes a hook-like connecting member and the second connecting means includes a receptacle opening of complementary size for receipt of the first connecting member.

5. The cutting board of claim 2 wherein:

the first connecting means includes a connecting member having a neck connected to a lateral edge of the first cutting board;

a lip connected to the neck having a length and width greater than the neck but less than corresponding dimensions of the lateral edge of the first cutting board;

said second connecting means including a receptacle opening in the inner lateral edge of the second cutting board, said receptacle opening including a first slot that is laterally and downwardly open and of a size for receipt of the neck of the connecting member on the first cutting board, and a second downwardly open slot connected to the first slot and wider and longer than the first slot so that the lip of the first connecting member fits in the second slot with the neck thereof positioned in the first slot.

6. The cutting board combination of claim 5 wherein:

the second cutting board is longer and wider that the first cutting board.

7. The cutting board combination of claim 6 including:

first connecting means on both lateral edges of the first cutting board.

8. The cutting board combination of claim 6 wherein:

the positions of the first and second legs are adjustable on the bottom surface of the first cutting board.

9. The cutting board combination of claim 8 including:

a plurality of threaded openings tapped into the bottom surface of the first cutting board;

each leg having a axial bore and a bolt extended through it for engagement with one of the openings in the bottom surface of the first cutting board.

10. The cutting board combination of claim 9 wherein:

the threaded openings are in a symmetrical pattern of groups of two.

11. The cutting board combination of claim 10 including:

a peg on each leg spaced from the bore and facing the bottom surface of the first cutting board; selected of said holes arranged apart a distance equal to the distance between the peg and the bore on a leg so that when the bolt engages an opening in the bottom surface of the first cutting board, the peg occupies another hole.

12. The cutting board combination of claim 1 wherein:

the positions of the first and second legs are adjustable on the bottom surface of the first cutting board.

13. The cutting board combination of claim 12 including:

a plurality of threaded openings tapped into the bottom surface of the first cutting board;

each leg having a axial bore and a bolt extended through it for engagement with one of the openings in the bottom surface of the first cutting board.

14. The cutting board combination of claim 13 wherein:

the threaded openings are in a symmetrical pattern of groups of two.

15. The cutting board combination of claim 14 including:

a peg on each leg spaced from the bore and facing the bottom surface of the first cutting board; selected of said holes arranged apart a distance equal to the distance between the peg and the bore on a leg so that when the bolt engages an opening in the bottom surface of the first cutting board, the peg occupies another hole.

* * * * *